(12) United States Patent
Mori

(10) Patent No.: US 9,481,546 B2
(45) Date of Patent: Nov. 1, 2016

(54) REEL

(71) Applicant: FUJIFILM CORPORATION, Minato-ku, Tokyo (JP)

(72) Inventor: Yasuhiro Mori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

(21) Appl. No.: 14/294,166

(22) Filed: Jun. 3, 2014

(65) Prior Publication Data

US 2014/0263818 A1 Sep. 18, 2014

Related U.S. Application Data

(63) Continuation of application No. PCT/JP2012/080389, filed on Nov. 22, 2012.

(30) Foreign Application Priority Data

Mar. 30, 2012 (JP) ................................ 2012-082920

(51) Int. Cl.
*B65H 75/18* (2006.01)
*B65H 75/14* (2006.01)
(Continued)

(52) U.S. Cl.
CPC ............. *B65H 75/14* (2013.01); *G11B 23/037* (2013.01); *G11B 23/044* (2013.01); *G11B 23/113* (2013.01)

(58) Field of Classification Search
CPC ................... B65H 75/22; B65H 75/30; B65H 2701/5122; G11B 23/08757; G11B 23/107; G11B 23/02; G11B 23/037
USPC ............ 242/608.8, 338.1, 338.2, 348, 348.2, 242/608.4
See application file for complete search history.

(56) References Cited

U.S. PATENT DOCUMENTS 3,041,005 A 6/1962 Wallace
3,485,456 A * 12/1969 Tellen .................. G11B 23/037
242/608.4

(Continued)

FOREIGN PATENT DOCUMENTS

JP S63-118777 U 8/1988
JP H08-069677 A 3/1996

(Continued)

OTHER PUBLICATIONS

Partial English language translation of the following: Office action dated Aug. 26, 2014 from the Japanese Patent Office in a Japanese patent application corresponding to the instant patent application. This office action translation is submitted now in order to supplement the understanding of the cited references which are being disclosed in the instant Information Disclosure Statement.

(Continued)

*Primary Examiner* — William A Rivera
(74) *Attorney, Agent, or Firm* — SOLARIS Intellectual Property Group, PLLC

(57) ABSTRACT

A reel includes: a hub in which plural through holes are formed at a connecting portion that interconnects a cylinder portion and an axial center portion; a first flange disposed on one end portion of the hub and equipped with first insertion portions that are inserted into the through holes; a second flange disposed on the other end portion of the hub and equipped with second insertion portions that are inserted into the through holes; and joint portions configured to join the first insertion portions and the second insertion portions, with spaces between radial direction inside wall surfaces of the through holes and radial direction inside wall surfaces of the first insertion portions and the second insertion portions being smaller than spaces between radial direction outside wall surfaces of the through holes and radial direction outside wall surfaces of the first insertion portions and the second insertion portions.

6 Claims, 9 Drawing Sheets

(51) Int. Cl.
*G11B 23/04* (2006.01)
*G11B 23/113* (2006.01)
*G11B 23/037* (2006.01)

(56) References Cited

U.S. PATENT DOCUMENTS

| | | | |
|---|---|---|---|
| 5,564,647 A | 10/1996 | Bay et al. | |
| 7,533,840 B2* | 5/2009 | Sumiya | G11B 23/107 242/348 |
| 7,832,683 B2* | 11/2010 | Ashikawa | B65H 75/14 242/348 |
| 8,485,463 B2* | 7/2013 | Mori | G11B 23/043 242/348 |
| 2002/0074448 A1 | 6/2002 | Nawa | |
| 2007/0252026 A1* | 11/2007 | Sumiya | G11B 23/107 242/348 |
| 2011/0168828 A1* | 7/2011 | Mori | G11B 23/043 242/348.2 |
| 2011/0186674 A1* | 8/2011 | Hiraguchi | B32B 37/04 242/348 |

FOREIGN PATENT DOCUMENTS

| | | |
|---|---|---|
| JP | 2002-133818 | 5/2002 |
| JP | 2007-299437 A | 11/2007 |

OTHER PUBLICATIONS

Written Opinion of the ISA issued in International Application No. PCT/JP2012/080389 on Nov. 22, 2012.
International Search Report issued in International Application No. PCT/JP2012/080389 on Nov. 22, 2012.

* cited by examiner

REEL

CROSS-REFERENCE TO RELATED APPLICATION

This application is a continuation application of International Application No. PCT/JP2012/080389, filed Nov. 22, 2012, the disclosure of which is incorporated herein by reference in its entirety. Further, this application claims priority from Japanese Patent Application No. 2012-082920, filed Mar. 30, 2012, the disclosure of which is incorporated herein by reference in its entirety.

BACKGROUND

1. Technical Field

The present invention relates to a reel around which recording tape such as magnetic tape is wound.

2. Related Art

As a reel housed in a recording tape cartridge, a reel having a so-called 3-piece structure, in which a first cylinder portion formed on an inner peripheral portion of a first flange and a second cylinder portion formed on an inner peripheral portion of a second flange are welded together, and with a hub being disposed over outer peripheral surface sides of the first cylinder portion and the second cylinder portion, has conventionally been known (e.g., see Japanese Patent Application Laid-open (JP-A) No. 2007-299437).

In this reel, a groove into which a rib projectingly disposed on the second flange is inserted is formed on one axial direction end surface of the hub, so that the hub does not relatively rotate with respect to the first flange and the second flange. Additionally, a space that absorbs deformation of the hub caused by tightening of the recording tape is disposed between an inner wall of the groove and an outer wall of the rib.

However, when this space is formed, there are cases where it becomes difficult to center the first flange and the second flange with respect to the hub. In this way, there is a tradeoff between a structure that absorbs deformation of the hub caused by tightening of the recording tape and a structure that centers the first flange and the second flange with respect to the hub.

SUMMARY

Therefore, it is an object of the present invention to obtain a reel in which the first flange and the second flange can be centered with respect to the hub in a structure that can absorb deformation of the hub caused by tightening of the recording tape.

In order to achieve this object, a reel of a first aspect pertaining to the present invention includes: a hub that is equipped with an axial center portion, a cylinder portion, and a connecting portion that interconnects an outer peripheral surface of the axial center portion and an inner peripheral surface of the cylinder portion in a position away from axial direction end surfaces of the cylinder portion, with recording tape being wound around an outer peripheral surface of the cylinder portion and plural through holes being formed at the connecting portion; an annular first flange that is disposed on one axial direction end portion of the hub and is equipped with first insertion portions that are inserted into the through holes in the connecting portion; an annular second flange that is disposed on the other axial direction end portion of the hub and is equipped with second insertion portions that are inserted into the through holes in the connecting portion; and joint portions that are configured to join the first insertion portions and the second insertion portions, with spaces between radial direction inside wall surfaces of the through holes and radial direction inside wall surfaces of the first insertion portions and the second insertion portions being smaller than spaces between radial direction outside wall surfaces of the through holes and radial direction outside wall surfaces of the first insertion portions and the second insertion portions.

According to the first aspect pertaining to the present invention, the spaces between the radial direction inside wall surfaces of the through holes and the radial direction inside wall surfaces of the first insertion portions and the second insertion portions are smaller than the spaces between the radial direction outside wall surfaces of the through holes and the radial direction outside wall surfaces of the first insertion portions and the second insertion portions, so the first flange and the second flange can be centered with respect to the hub (the axial center portion). Furthermore, because of the spaces between the radial direction outside wall surfaces of the through holes and the radial direction outside wall surfaces of the first insertion portions and the second insertion portions, deformation of the hub (the cylinder portion) caused by the tightening force of the recording tape when the recording tape has been wound around the hub (the cylinder portion) can be absorbed.

Furthermore, a reel of a second aspect pertaining to the present invention is the reel of the first aspect, wherein the first insertion portions are projectingly disposed on a first inner peripheral portion of the first flange that is inserted on an inner peripheral surface side of the cylinder portion, the second insertion portions are projectingly disposed on a second inner peripheral portion of the second flange that is inserted on the inner peripheral surface side of the cylinder portion, and spaces between the inner peripheral surface of the cylinder portion and radial direction outside wall surfaces of the first inner peripheral portion and the second inner peripheral portion are the same as or larger than the spaces between the radial direction outside wall surfaces of the through holes and the radial direction outside wall surfaces of the first insertion portions and the second insertion portions.

According to the second aspect pertaining to the present invention, the spaces between the inner peripheral surface of the cylinder portion and the radial direction outside wall surfaces of the first inner peripheral portion and the second inner peripheral portion are the same as or larger than the spaces between the radial direction outside wall surfaces of the through holes and the radial direction outside wall surfaces of the first insertion portions and the second insertion portions, so deformation of the hub (the cylinder portion) caused by the tightening force of the recording tape when the recording tape has been wound around the hub (the cylinder portion) can be effectively absorbed by those spaces.

Furthermore, a reel of a third aspect pertaining to the present invention is the reel of the first aspect, wherein the connecting portion is formed on an axial direction center portion of the cylinder portion.

According to the third aspect pertaining to the present invention, the connecting portion is formed on the axial direction center portion of the cylinder portion, so deformation of the hub (the cylinder portion) caused by the tightening force of the recording tape can be absorbed equally in the axial direction by the spaces.

Furthermore, a reel of a fourth aspect pertaining to the present invention is the reel of the third aspect, wherein the first flange and the second flange are formed in the same shape.

According to the fourth aspect pertaining to the present invention, the first flange and the second flange can be molded using one mold, so their manufacturing cost can be reduced.

Furthermore, a reel of a fifth aspect pertaining to the present invention is the reel of the first aspect, wherein the axial center portion and the connecting portion are interconnected via a deformation absorbing portion that is formed in an annular shape and has a substantially U-shaped cross section.

According to the fifth aspect pertaining to the present invention, the axial center portion and the connecting portion are interconnected via the deformation absorbing portion that is formed in an annular shape and has a substantially U-shaped cross section, so deformation of the hub (the cylinder portion) caused by tightening of the recording tape can be absorbed by the deformation absorbing portion.

Furthermore, a reel of a sixth aspect pertaining to the present invention is the reel of the first aspect, wherein fastening portions for fastening to a rotation transmitting member of a drive device are formed at the axial center portion.

According to the sixth aspect pertaining to the present invention, the reel can be directly incorporated into a drive device.

BRIEF DESCRIPTION OF THE DRAWINGS

Exemplary embodiments of the present invention will be described in detail based on the following figures, wherein.

DETAILED DESCRIPTION

Embodiments pertaining to the present invention will be described in detail below on the basis of the drawings. For convenience of description, arrow UP in FIG. 1 denotes an up direction, arrow DO denotes a down direction, and a rotational axis direction of reels 10 and 20 pertaining to the embodiments coincides with the up and down direction (height direction). Furthermore, initially an overview of a drive device 50 in which the reels 10 and 20 are detachably disposed will be described, and then the configurations of the reels 10 and 20 will be described in detail. First, a first embodiment will be described.

<Overview of Drive Device>

Figure 1:
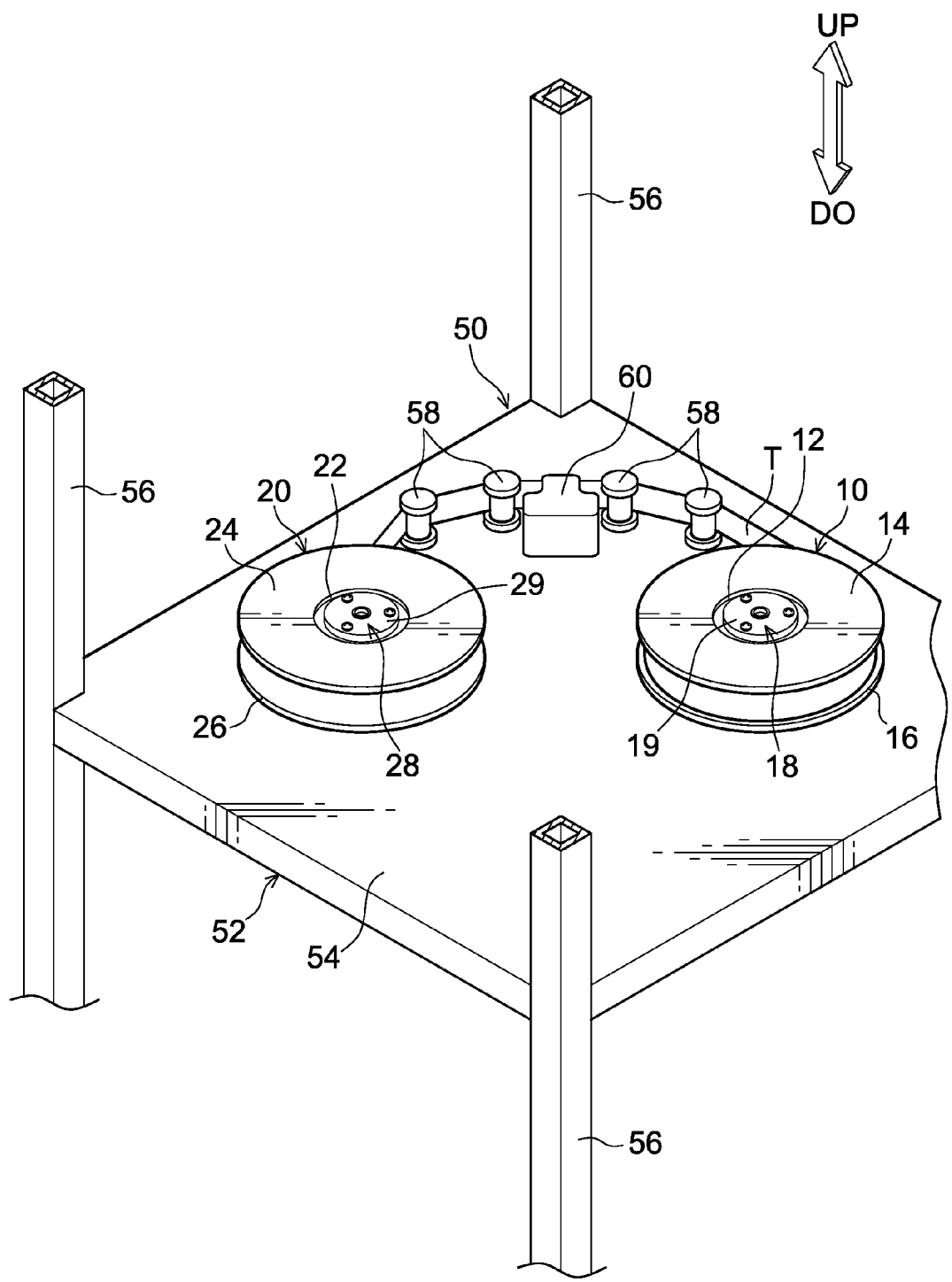
FIG. 1 is a perspective view showing a pair of reels incorporated into a drive device.

The reels 10 and 20 pertaining to the present embodiment are molded in the same shape using a synthetic resin material such as polycarbonate (PC), for example. Additionally, as shown in FIG. 1, the reels 10 and 20 are disposed as a pair inside a casing 52 (in FIG. 1, only a bottom plate 54 and three struts 56 are shown) of the drive device 50.

The reel 10 is for paying out recording tape (magnetic tape) T serving as an information recording and playback medium, the reel 20 is for taking up the recording tape T, and the recording tape T paid out from the reel 10 slidingly contacts a recording and playback head 60 while being taken up onto the reel 20. Additionally, the recording and playback head 60 records data on the recording tape T and plays back data recorded on the recording tape T.

On the bottom plate 54 on both sides of the recording and playback head 60, plural (those shown in the drawing comprise two on each side for a total of four) tape guides 58 are disposed in such a way that they may freely rotate, and the recording tape T pulled out from the reel 10 and taken up onto the reel 20 is guided by the tape guides 58.

Figure 2:
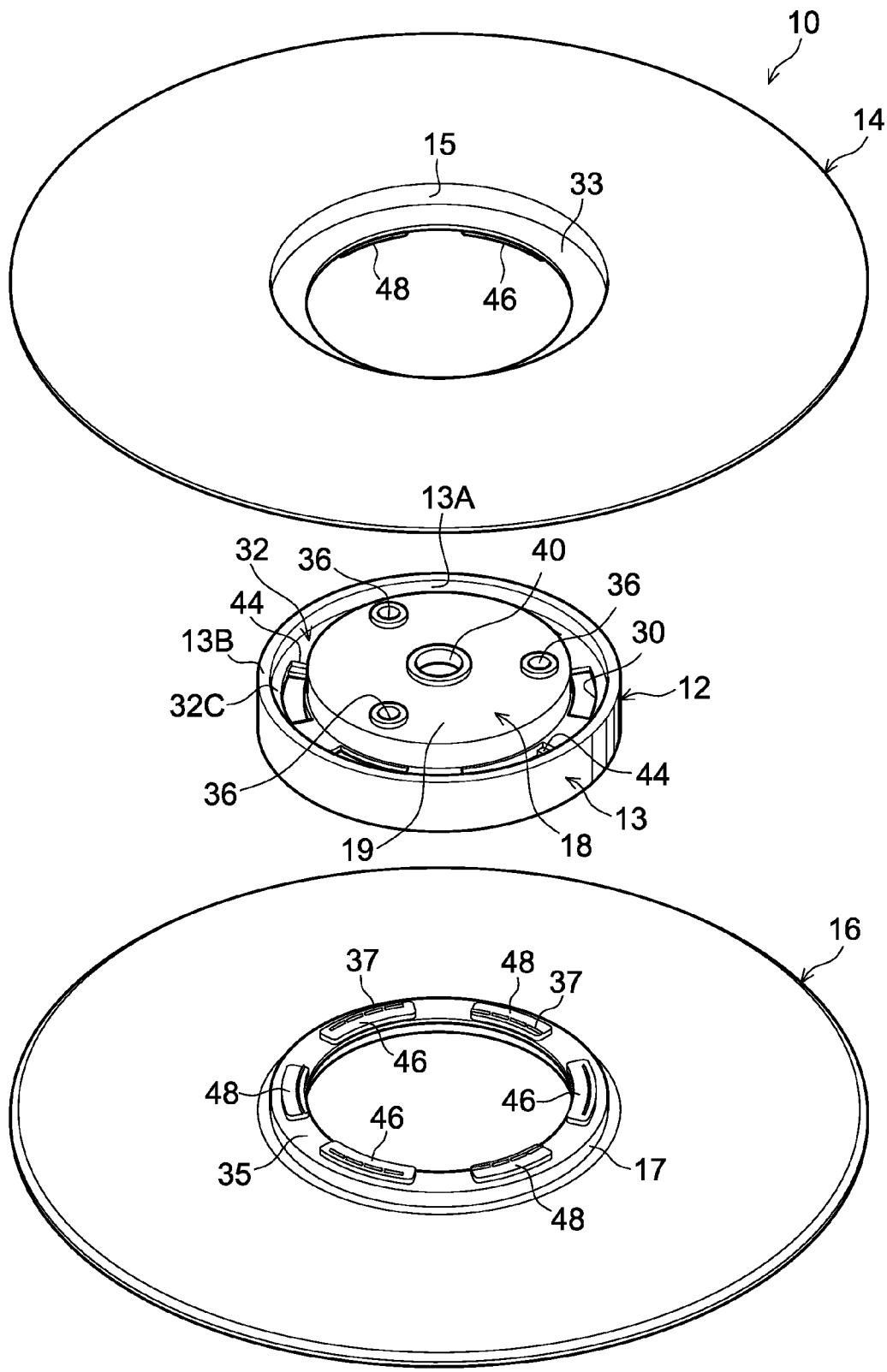
FIG. 2 is an exploded perspective view of a reel pertaining to a first embodiment.

Furthermore, the reels 10 and 20 are configured to include: reel hubs 12 and 22 that are equipped, on their rotational center sides, with short cylinder-like axial center portions 18 and 28 having top plates 19 and 29 and are also equipped with substantially cylindrical cylinder portions 13 (see FIG. 2 and FIG. 3) on radial direction outsides of the axial center portions 18 and 28; annular upper flanges 14 and 24 serving as first flanges that are disposed on upper end portion sides of the reel hubs 12 and 22; and annular lower flanges 16 and 26 serving as second flanges that are disposed on lower end portion sides of the reel hubs 12 and 22 (see FIG. 2).

Additionally, the recording tape T is wound around the outer peripheral surface of the cylinder portion 13 of the reel hub 12 of the reel 10, and width direction end portions of the wound recording tape T are retained by the upper flange 14 and the lower flange 16. Furthermore, the recording tape T paid out from the reel 10 is wound around the outer peripheral surface of the cylinder portion (not shown in the drawings) of the reel hub 22 of the reel 20, and the width direction end portions of the recording tape T are retained by the upper flange 24 and the lower flange 26.

"Substantially cylindrical" in the present embodiment includes: having a generally solid cylinder-like shape, in which the shape of the outer peripheral surface (winding surface) of the cylinder portion 13 of the reel hubs 12 and 22 around which the recording tape T is wound is formed in the shape of a drum or the like; and having a hollow shape that is not completely cylindrical, in which ribs or the like are projectingly disposed on the inner peripheral surface side of the cylinder portion 13 of the reel hubs 12 and 22.

Furthermore, a motor (not shown in the drawings) serving as a drive source is disposed in the drive device 50, and a pair of rotation transmitting members (not shown in the drawings) to which rotational driving force is transmitted from a rotating shaft (not shown in the drawings) of the motor are rotatably disposed inside a pair of open portions (not shown in the drawings) formed at the casing 52 (the bottom plate 54) of the drive device 50.

Additionally, later-described screw hole portions 36 are formed in a circumferential direction at the axial center portions 18 and 28 of the reels 10 and 20, and the reels 10 and 20 are integrally fastened and fixed to the rotation transmitting members by inserting non-illustrated screws through the screw hole portions 36 and screwing the screws into the rotation transmitting members.

<Configurations of Reels>

Next, the configurations of the reels 10 and 20 will be described in detail, but because the reel 10 and the reel 20 have the same shape, mainly the reel 10 will be taken as an example and described below.

As shown in FIG. 2, an upper cylinder portion 15 serving as a first inner peripheral portion that extends a predetermined height downward so as to be inserted on an inner peripheral surface 13A side of the cylinder portion 13 of the reel hub 12 is integrally formed on the inner peripheral edge portion of the upper flange 14 of the reel 10. Additionally, a lower cylinder portion 17 serving as a second inner peripheral portion that extends a predetermined height upward so as to be inserted on the inner peripheral surface 13A side of the cylinder portion 13 of the reel hub 12 is integrally formed on the inner peripheral edge portion of the lower flange 16 of the reel 10.

The height of the upper cylinder portion 15 and the height of the lower cylinder portion 17 are the same, and the height of the reel hub 12 is a height of an extent wherein spaces S3 (see FIG. 6) are formed between an upper end surface 13B of the cylinder portion 13 of the reel hub 12 and a lower surface 14A of the upper flange 14 and between a lower end surface 13C of the cylinder portion 13 of the reel hub 12 and an upper surface 16A of the lower flange 16 when, as described later, the reel hub 12 has been disposed over outer peripheral surface sides of the upper cylinder portion 15 and the lower cylinder portion 17 (when projecting portions 46 and 48 have been joined together to assemble the reel 10).

Figure 4:
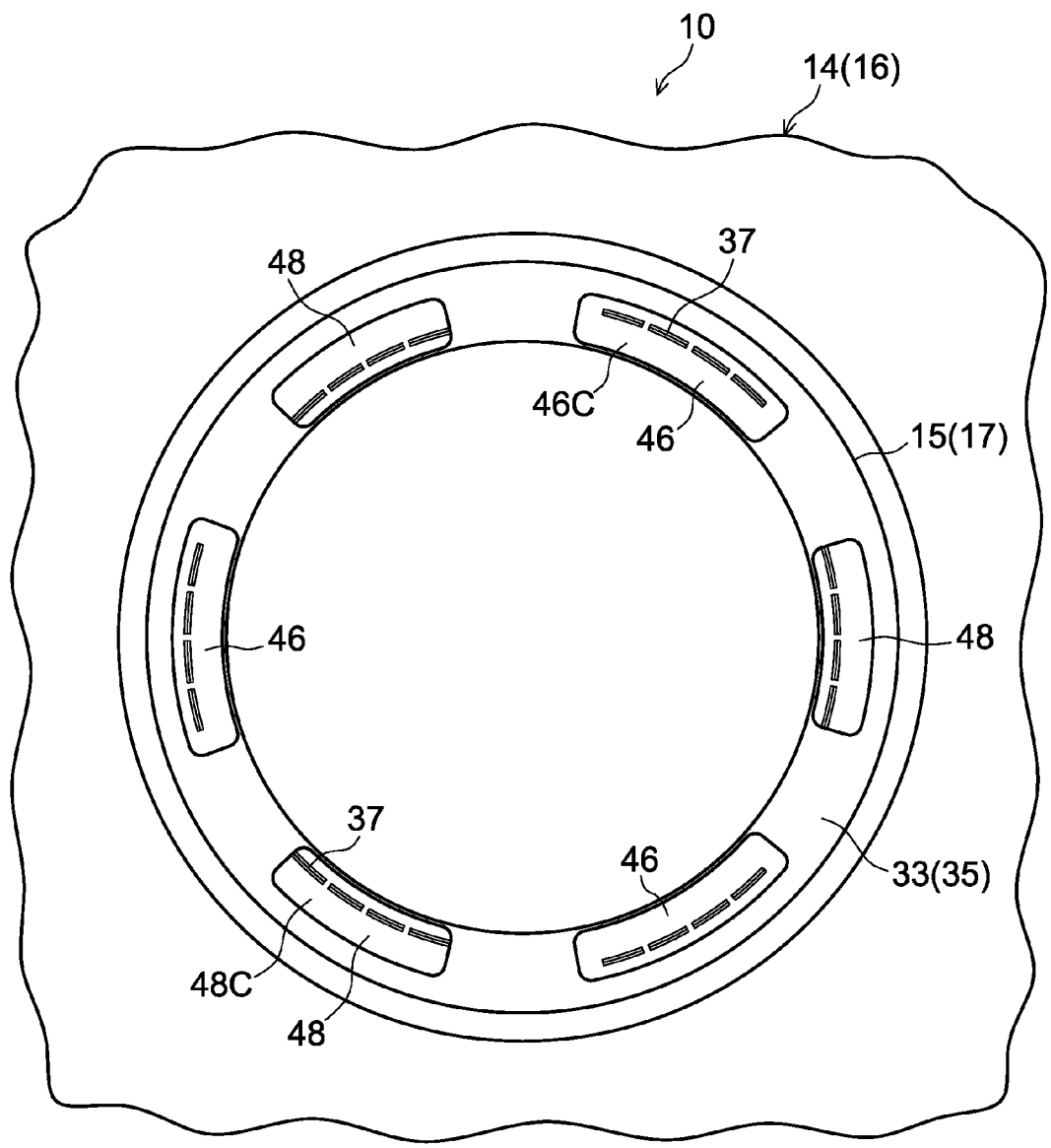
FIG. 4 is a plan view showing insertion portions formed on flanges of the reel pertaining to the first embodiment.

Furthermore, as shown in FIG. 2 and FIG. 4, a tabular protruding portion 33 that annularly protrudes inward in the radial direction (toward the rotational center portion of the reel 10) is integrally formed on the lower end portion of the upper cylinder portion 15. Additionally, a tabular protruding portion 35 that annularly protrudes inward in the radial direction (toward the rotational center portion of the reel 10) is integrally formed on the upper end portion of the lower cylinder portion 17.

Moreover, near the radial direction inside of the lower surface of the protruding portion 33 of the upper flange 14 (the upper cylinder portion 15), plural (those shown in the drawings comprise three each at 120° intervals for a total of six) tabular projecting portions 46 and 48 serving as first insertion portions and joint portions are projectingly disposed alternately and at equidistant intervals in the circumferential direction. Additionally, near the radial direction inside of the upper surface of the protruding portion 35 of the lower flange 16 (the lower cylinder portion 17), plural (those shown in the drawings comprise three each at 120° intervals for a total of six) tabular projecting portions 46 and 48 serving as second insertion portions and joint portions are projectingly disposed alternately and at equidistant intervals in the circumferential direction.

The projecting portions 46 projectingly disposed on the protruding portion 33 and the projecting portions 46 projectingly disposed on the protruding portion 35, and the projecting portions 48 projectingly disposed on the protruding portion 33 and the projecting portions 48 projectingly disposed on the protruding portion 35, have the same shape and the same height (plate thickness), respectively, and, in the plan view shown in FIG. 4, are formed in substantial arc shapes along the circumferential direction.

Additionally, the projecting portions 46 and the projecting portions 48 are configured in such a way that their circumferential direction lengths are different—that is, in such a way that the projecting portions 46 are longer than the projecting portions 48—and are configured in such a way that the positions of energy directors (hereinafter called "EDs") 37 serving as welding sites formed on welding surfaces 46C of the projecting portions 46 and the positions of EDs 37 serving as welding sites formed on welding surfaces 48C of the projecting portions 48 are different in the radial direction.

Specifically, the EDs 37 of the projecting portions 46 are formed in one row intermittently (at equidistant intervals) along the circumferential direction on the radial direction outsides of the welding surfaces 46C, and the EDs 37 of the projecting portions 48 are formed in one row intermittently (at equidistant intervals) along the circumferential direction on the radial direction insides of the welding surfaces 48C.

Additionally, as described later, when joining together the upper flange 14 and the lower flange 16, the welding surfaces 46C of the projecting portions 46 of the upper flange 14 and the welding surfaces 48C of the projecting portions 48 of the lower flange 16 are made to face one another, and the welding surfaces 48C of the projecting portions 48 of the upper flange 14 and the welding surfaces 46C of the projecting portions 46 of the lower flange 16 are made to face one another.

Figure 3:
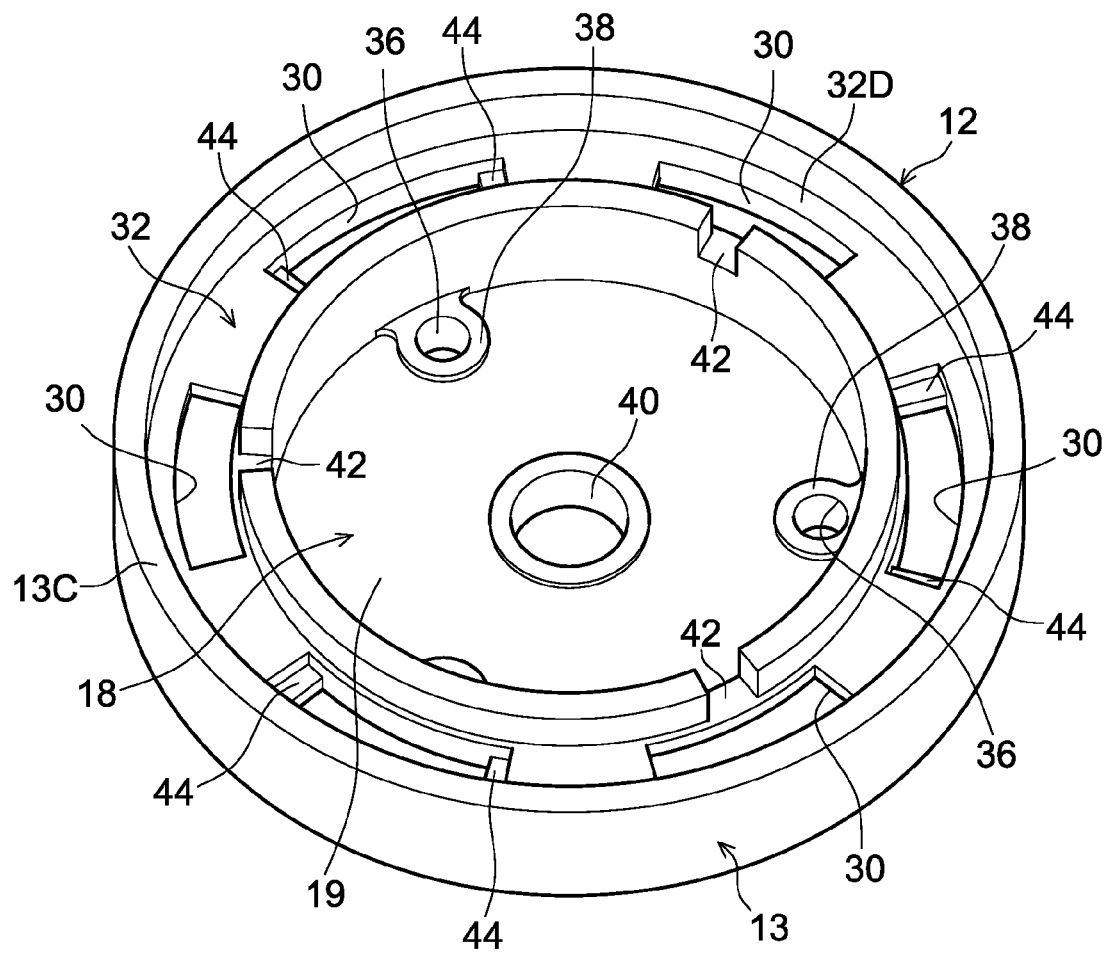
FIG. 3 is a perspective view showing a reel hub of the reel pertaining to the first embodiment as seen from below.
Figure 6:
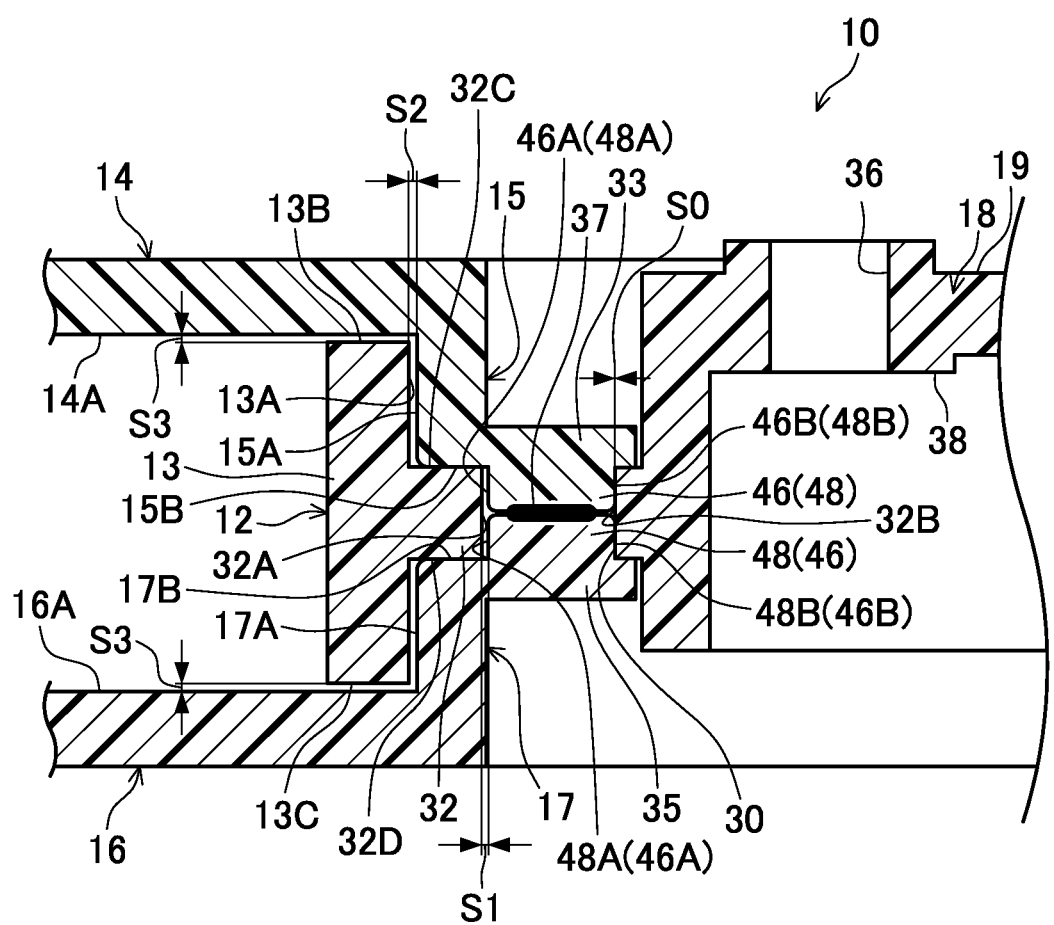
FIG. 6 is an enlarged cross-sectional view in a radial direction showing main portions of the reel pertaining to the first embodiment.

As shown in FIG. 2, FIG. 3, and FIG. 6, the height (axial) direction center portion (a position away from the axial direction end surfaces 13B and 13C) of the inner peripheral surface 13A of the cylinder portion 13 of the reel hub 12 and the height (axial) direction substantial center portion (a position away from the top plate 19) of the outer peripheral surface of the axial center portion 18 are integrally interconnected by a tabular, annular connecting portion 32. Additionally, plural (a number equal to the number of the projecting portions 46 and 48; in this case, three each for a total of six) through holes 30 having the same shapes as the projecting portions 46 and 48 are formed at equidistant intervals in the connecting portion 32.

The through holes 30 in the connecting portion 32 are formed near the axial center portion 18 (the radial direction inside) and are configured in such a way that the projecting portions 46 and the projecting portions 48 can be fitted into them. Specifically, on both circumferential direction edge portions of each of the through holes 30, a pair of step portions 44 for accommodating the differences in the circumferential direction lengths of the projecting portions 46 and the projecting portions 48 (for allowing the insertion of both circumferential direction edge portions of the projecting portions 46, which are longer in the circumferential direction than the projecting portions 48) are formed alternately on an upper surface 32C side and a lower surface 32D side of the connecting portion 32.

Figure 5:
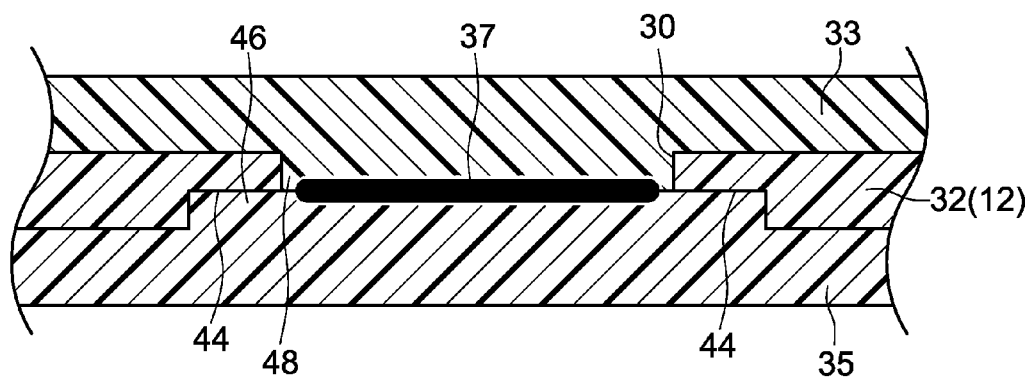
FIG. 5 is an enlarged cross-sectional view in a circumferential direction showing a state in which the insertion portions formed on the flanges of the reel pertaining to the first embodiment have been welded together.

Additionally, as shown in FIG. 5 and FIG. 6, the plate thickness of the connecting portion 32 is about two times the projecting height (plate thickness) of the projecting portions 46 and 48, and the depth of the step portions 44 is substantially the same size as the projecting height (plate thickness) of the projecting portions 46 (about ½ of the plate thickness of the connecting portion 32).

Consequently, the reel 10 has a configuration wherein the reel hub 12 is made relatively non-rotatable (is stopped from turning) with respect to the upper flange 14 and the lower flange 16 as a result of the projecting portions 46 and 48 of the upper flange 14 being fitted from above and the projecting portions 48 and 46 of the lower flange 16 being fitted from below into the through holes 30 disposed in the connecting portion 32.

Additionally, the upper flange 14 and the lower flange 16 are joined together as a result of the welding surfaces 46C of the projecting portions 46 of the protruding portion 33 and the welding surfaces 48C of the projecting portions 48 of the protruding portion 35 being ultrasonically welded together and the welding surfaces 48C of the projecting portions 48 of the protruding portion 33 and the welding surfaces 46C of the projecting portions 46 of the protruding portion 35 being ultrasonically welded together.

That is, the reel 10 has a configuration wherein the EDs 37 on the welding surfaces 46C of the projecting portions 46 and the EDs 37 on the welding surfaces 48C of the projecting portions 48 are fused, whereby the upper flange 14 and the lower flange 16 are joined together and the reel hub 12 (the cylinder portion 13) is integrally attached to the outer peripheral surface sides of the upper cylinder portion 15 and the lower cylinder portion 17.

In this way, the projecting portions 46 and the projecting portions 48 fitted into the through holes 30 are welded together by the EDs 37, which have a positional relationship in which they are offset from one another in the radial direction so that they do not lie on top of one another. Consequently, with the projecting portions 46 and the projecting portions 48, it becomes difficult for inclination to occur in the radial direction and axial run-out of the upper flange 14 and the lower flange 16 can be suppressed or prevented.

Furthermore, in this way, because the upper flange 14 and the lower flange 16 have the same shape, the upper flange 14 and the lower flange 16 can be molded using one mold. Because of this, the manufacturing cost of the upper flange 14 and the lower flange 16 is reduced.

Furthermore, as shown in FIG. 6, a lower end surface 15B of the upper cylinder portion 15 is in contact around its entire circumference with the upper surface 32C of the connecting portion 32 on the radial direction outsides of the through holes 30, and an upper end surface 17B of the lower cylinder portion 17 is in contact around its entire circumference with the lower surface 32D of the connecting portion 32 on the radial direction outsides of the through holes 30.

Because of this, the up and down direction positions (heights) of the upper flange 14 and the lower flange 16 with respect to the reel hub 12 are defined (positioned), and the connecting portion 32 is sandwiched between the upper cylinder portion 15 and the lower cylinder portion 17, so the cylinder portion 13 does not slip out of position in the axial direction. That is, as described above, the spaces S3 are formed between the upper end surface 13B of the cylinder portion 13 of the reel hub 12 and the lower surface 14A of the upper flange 14 and between the lower end surface 13C of the cylinder portion 13 of the reel hub 12 and the upper surface 16A of the lower flange 16.

Additionally, in this state, as described above, the welding surfaces 46C and 48C of the projecting portions 46 and 48 of the protruding portion 33 and the welding surfaces 48C and 46C of the projecting portions 48 and 46 of the protruding portion 35 are joined together. That is, the welding surfaces 46C and 48C of the projecting portions 46 and 48 of the protruding portion 33 and the welding surfaces 48C and 46C of the projecting portions 48 and 46 of the protruding portion 35 do not touch one another, and both are joined together by adjusting the height (amount) of the EDs 37.

Furthermore, as shown in FIG. 6, spaces S0 between wall surfaces 32B, which are arc-shaped as seen in a plan view, on the radial direction insides of the through holes 30 and wall surfaces 46B and 48B, which are arc-shaped as seen in a plan view, on the radial direction insides of the projecting portions 46 and the projecting portions 48 welded together inside the through holes 30 are smaller than spaces S1 between wall surfaces 32A, which are arc-shaped as seen in a plan view, on the radial direction outsides of the through holes 30 and wall surfaces 46A and 48A, which are arc-shaped as seen in a plan view, on the radial direction outsides of the projecting portions 46 and the projecting portions 48 welded together inside the through holes 30 (S0<S1). That is, the spaces S0 are, for example, less than 0.05 mm, and the spaces S1 are, for example, equal to or larger than 0.05 mm and equal to or less than 0.5 mm. Because of this, the reel 10 has a configuration wherein the upper flange 14 and the lower flange 16 can be centered with respect to the axial center portion 18 of the reel hub 12.

Furthermore, spaces S2 between the inner peripheral surface 13A of the cylinder portion 13 of the reel hub 12 and outer peripheral surfaces 15A and 17A of the upper cylinder portion 15 and the lower cylinder portion 17 are the same as or larger than the spaces S1 (S2>S1). That is, the spaces S2 are also, for example, equal to or larger than 0.05 mm and equal to or less than 0.5 mm. Because of this, the reel 10 has a configuration wherein deformation of the cylinder portion 13 of the reel hub 12 caused by the tightening force of the recording tape T can be absorbed by the spaces S2 and can also be absorbed by the spaces S1.

Furthermore, as shown in FIG. 2 and FIG. 3, plural (e.g., three) screw hole portions 36 serving as fastening portions that allow screws for fastening (screwing) into screw boss portions (not shown in the drawings) formed at the rotation transmitting member of the drive device 50 to pass through are formed at equidistant intervals on a common circumference in the top plate 19 of the axial center portion 18.

Additionally, annular projecting portions 38 that project downward in cylindrical shapes coaxial with the screw boss portions 36 (communicated with the screw boss portions 36) are integrally formed on the lower surface sides of the screw hole portions 36. The reel 10 has a configuration wherein the reel 10 (the axial center portion 18) is positioned in the up and down (height) direction with respect to the rotation transmitting member of the drive device 50 as a result of the annular projecting portions 38 contacting the upper surface of the rotation transmitting member.

Furthermore, a circular hole portion 40 is formed at the rotational center portion of the axial center portion 18. The reel 10 has a configuration wherein the reel 10 (the axial center portion 18) is positioned (centered) in the radial direction with respect to the rotation transmitting member of the drive device 50 as a result of a shaft portion (not shown in the drawings) projectingly disposed on the rotation transmitting member being inserted (fitted) into the hole portion 40.

Moreover, plural (e.g., three) tongue portions (not shown in the drawings) are projectingly disposed at equidistant intervals on a common circumference on the rotation transmitting member of the drive device 50, and plural (a number equal to the number of the tongue portions; in this case, three) recessed portions 42 that are fitted together with the tongue portions are formed at equidistant intervals on the lower end portion of the axial center portion 18. Because of this, the reel 10 has a configuration wherein the reel 10 (the axial center portion 18) is positioned in the circumferential direction with respect to the rotation transmitting member, and before fastening is performed using screws, the screw hole portions 36 can be aligned with the screw boss portions formed at the rotation transmitting member.

Next, the action of the reel 10 having the above configuration will be described.

As described above, the reel 10 is manufactured by fitting, into the plural through holes 30 formed at the connecting portion 32, the plural (a number equal to the number of the through holes 30) projecting portions 46 and 48 of the upper flange 14 and the plural (a number equal to the number of the through holes 30) projecting portions 48 and 46 of the lower flange 16 and joining together the welding surfaces 46C of the projecting portions 46 and the welding surfaces 48C of the projecting portions 48 using ultrasonic welding.

That is, in the welding step for manufacturing the reel 10, it suffices simply to ultrasonically weld together the welding surfaces 46C of the projecting portions 46 and the welding surfaces 48C of the projecting portions 48, so compared to a configuration where, for example, the lower end surface of the upper cylinder portion 15 and the upper end surface of the lower cylinder portion 17 are ultrasonically welded around their entire circumferences to the connecting portion 32, machining efficiency can be improved (machining time needed for welding can be shortened).

Moreover, the projecting portions 46 and 48 are welded together on the radial direction outside of the axial center portion 18 (inside the through holes 30 formed at the connecting portion 32), so compared to a configuration where, for example, the projecting portions 46 and 48 are welded together on the radial direction inside of the axial center portion 18, the upper flange 14 and the lower flange 16 can be stably welded together.

Furthermore, by ultrasonically welding together the projecting portions 46 and 48 of the upper flange 14 and the projecting portions 48 and 46 of the lower flange 16 that are fitted into the through holes 30 formed at the connecting portion 32 of the reel hub 12, the upper flange 14 and the lower flange 16 can be joined together and the reel hub 12 can be attached to the upper flange 14 and the lower flange 16 in such a way as to be relatively non-rotatable.

Consequently, it is not necessary to form, on the reel hub 12 or the upper flange 14 and the lower flange 16, a separate turn-stop mechanism for making the reel hub 12 relatively non-rotatable. That is, compared to a configuration where a separate turn-stop mechanism for making the reel hub 12 relatively non-rotatable is formed on the reel hub 12 or the upper flange 14 and the lower flange 16, the structure of the molds for molding those can be simplified and the costs associated with those molds can be reduced.

Moreover, the upper flange 14 and the lower flange 16 have the same shape, so it suffices to use one mold to manufacture the upper flange 14 and the lower flange 16. Consequently, compared to a configuration where the shapes of the upper flange 14 and the lower flange 16 are different and separate molds for the upper flange 14 and the lower flange 16 are necessary, the costs associated with those molds can be further reduced.

Furthermore, by fitting, into the plural through holes 30 formed at equidistant intervals in the connecting portion 32 of the reel hub 12, the plural (a number equal to the number of the through holes 30) projecting portions 46 and 48 formed at equidistant intervals on the upper flange 14 and the plural (a number equal to the number of the through holes 30) projecting portions 48 and 46 formed at equidistant intervals on the lower flange 16, erroneous insertion thereof can be prevented and looseness (axial misalignment) between the reel hub 12 and the upper flange 14 and lower flange 16 can be suppressed or prevented.

In particular, the spaces S0 between the wall surfaces 32B on the radial direction insides of the through holes 30 and the wall surfaces 46B and 48B on the radial direction insides of the projecting portions 46 and the projecting portions 48 welded together inside the through holes 30 is smaller than the spaces S1 between the wall surfaces 32A on the radial direction outsides of the through holes 30 and the wall surfaces 46A and 48A on the radial direction outsides of the projecting portions 46 and the projecting portions 48 welded together inside the through holes 30 (S0<S1). Consequently, the upper flange 14 and the lower flange 16 can be precisely centered with respect to the axial center portion 18 of the reel hub 12.

Furthermore, the spaces S2 between the inner peripheral surface 13A of the cylinder portion 13 of the reel hub 12 and the outer peripheral surfaces 15A and 17A of the upper cylinder portion 15 and the lower cylinder portion 17 are the same as or larger than the spaces S1 (S2≧S1). Consequently, deformation of the cylinder portion 13 of the reel hub 12 caused by the tightening force of the recording tape T (deformation in which sections of the cylinder portion 13 closer to the axial direction end surfaces 13B and 13C than the axial direction center portion collapse inward in the radial direction) can be effectively (substantially equally in the up and down direction) absorbed by the spaces S2 and can also be effectively absorbed by the spaces S1.

Furthermore, in the reel 10, the lower end surface 15B of the upper cylinder portion 15 is brought into contact around its entire circumference with the upper surface 32C of the connecting portion 32 on the radial direction outsides of the through holes 30, and the upper end surface 17B of the lower cylinder portion 17 is brought into contact around its entire circumference with the lower surface 32D of the connecting portion 32 on the radial direction outsides of the through holes 30, whereby the up and down direction positions (heights) of the upper flange 14 and the lower flange 16 with respect to the reel hub 12 are defined (positioned).

Consequently, the spaces S3 can be formed between the upper end surface 13B of the cylinder portion 13 of the reel hub 12 and the lower surface 14A of the upper flange 14 and between the lower end surface 13C of the cylinder portion 13 of the reel hub 12 and the upper surface 16A of the lower flange 16, so that even if the cylinder portion 13 of the reel hub 12 is deformed by the tightening force of the recording tape T, it can be ensured that the deformation does not affect the upper flange 14 and the lower flange 16 (changes in the axial direction positions of the upper flange 14 and the lower flange 16 caused by deformation of the cylinder portion 13 can be suppressed or prevented).

Moreover, the short cylinder-like axial center portion 18, which is coaxial with the cylinder portion 13, is integrally formed via the connecting portion 32 on the inner peripheral surface 13A side of the cylinder portion 13 of the reel hub 12, so the radial direction stiffness (strength) of the reel hub 12 is improved compared to a reel hub (not shown in the drawings) in which the short cylinder-like axial center portion 18 is not integrally formed. Thus, deformation of the cylinder portion 13 of the reel hub 12 caused by the tightening force of the recording tape T can be further suppressed, and it can be ensured that deformation does not affect the upper flange 14 and the lower flange 16.

Furthermore, the fastening portions (the screw hole portions 36) that fasten to the drive device 50 (the rotation transmitting member) are disposed in the axial center portion 18 integrally disposed in the reel hub 12 around which the recording tape T is wound, so compared to a configuration where the fastening portions that fasten to the drive device 50 are separate from the reel hub 12, the stiffness (strength) of the reel hub 12 can be ensured and the traveling stability of the recording tape T can be improved.

The reel 20 is also the same, and the reels 10 and 20 are fastened and fixed by screws to the rotation transmitting members of the drive device 50. That is, screws are inserted through the screw hole portions 36 of the axial center portions 18 and 28 of the reels 10 and 20 and are screwed into the screw boss portions of the rotation transmitting members, whereby the axial center portions 18 and 28 of the reels 10 and 20 are fastened to the rotation transmitting members. In this way, the reels 10 and 20 can be directly incorporated into the drive device 50.

Next, a second embodiment will be described. The same reference signs are assigned to parts that are the same as those in the first embodiment, and detailed description (also including action) is omitted. Furthermore, in the second embodiment also, the reel 10 is taken as an example and described, but the reel 20 is also the same.

Figure 7:
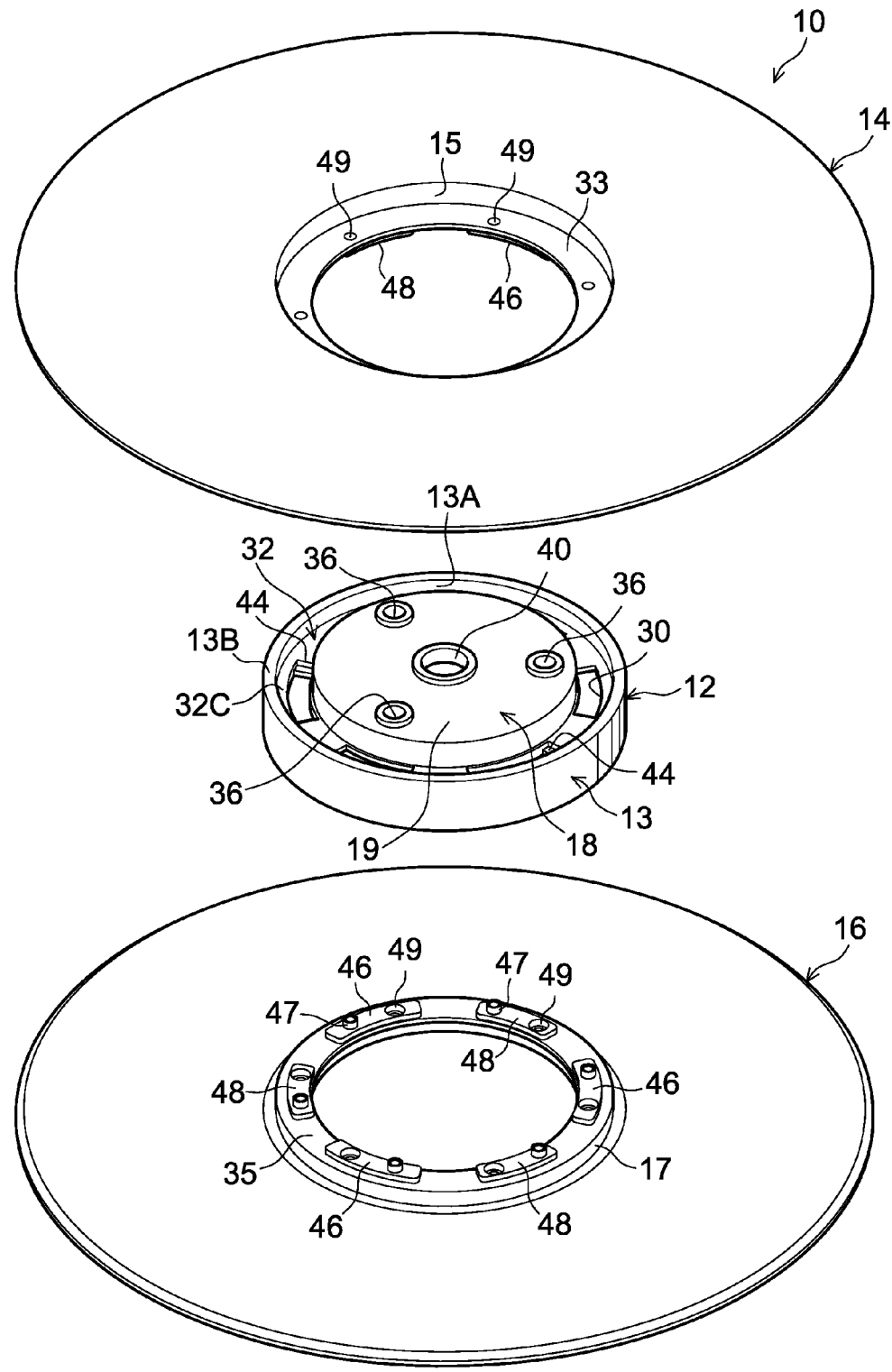
FIG. 7 is an exploded perspective view of a reel pertaining to a second embodiment.
Figure 8:
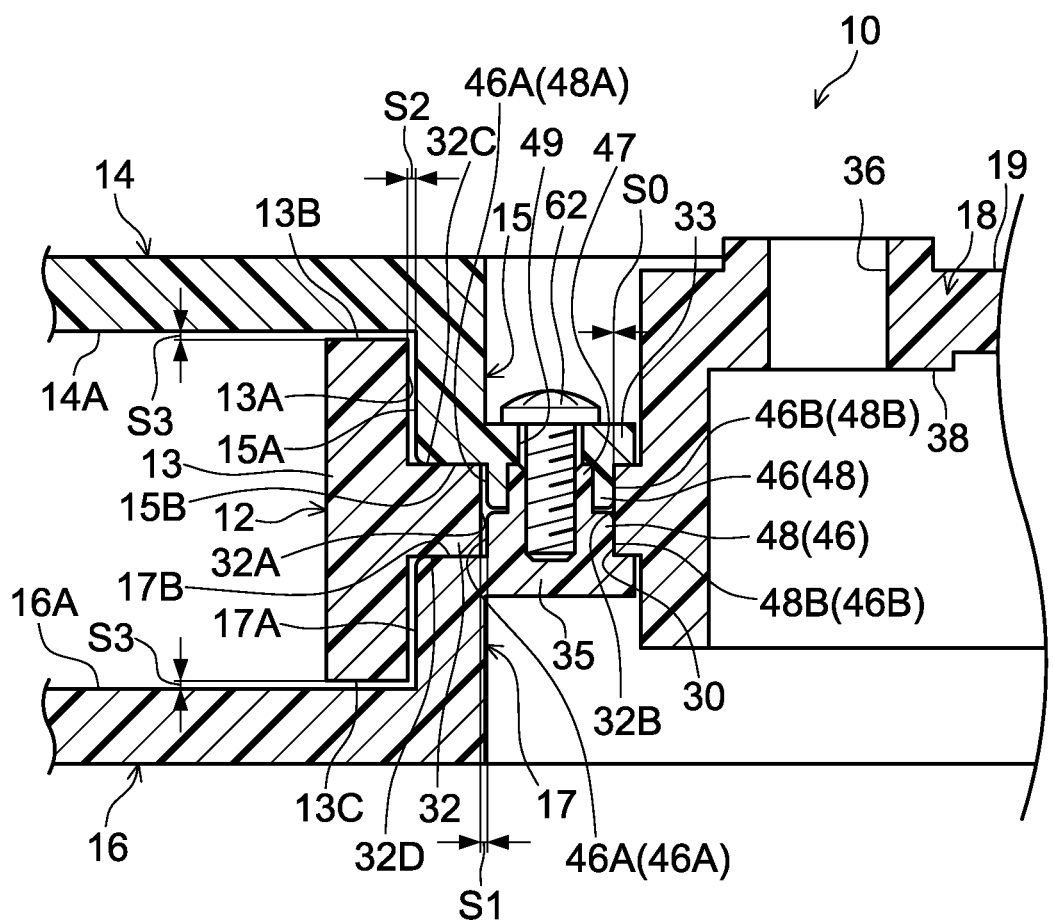
FIG. 8 is an enlarged cross-sectional view in a radial direction showing main portions of the reel pertaining to the second embodiment.

As shown in FIG. 7 and FIG. 8, the reel 10 pertaining to the second embodiment differs from the reel 10 pertaining to the first embodiment only in that the upper flange 14 and the lower flange 16 are joined together by screws rather than welding. That is, screw boss portions 47 that do not penetrate the projecting portions 46 and 48 are formed on one circumferential direction end side of each of the projecting portions 46 and 48, and screw hole portions 49 that penetrate the projecting portions 46 and 48 including also the protruding portions 33 and 35 are formed on the other circumferential direction end side of each of the projecting portions 46 and 48.

Consequently, as shown in FIG. 8, screws 62 are inserted from above the protruding portion 33 through the screw hole portions 49 formed at the projecting portions 46 and 48 (including also the protruding portion 33) and are fastened to (screwed into) the screw boss portions 47 formed at the projecting portions 48 and 46 of the protruding portion 35, and screws 62 are inserted from below the protruding portion 35 through the screw hole portions 49 formed at the projecting portions 48 and 46 (including also the protruding portion 35) and are fastened to (screwed into) the screw boss portions 47 formed at the projecting portions 46 and 48 of the protruding portion 33, whereby the upper flange 14 and the lower flange 16 are attached to the reel hub 12.

Next, a third embodiment will be described. The same reference signs are assigned to parts that are the same as those in the first embodiment and the second embodiment, and detailed description (also including action) is omitted. Furthermore, in the third embodiment also, the reel 10 is taken as an example and described, but the reel 20 is also the same.

Figure 9:
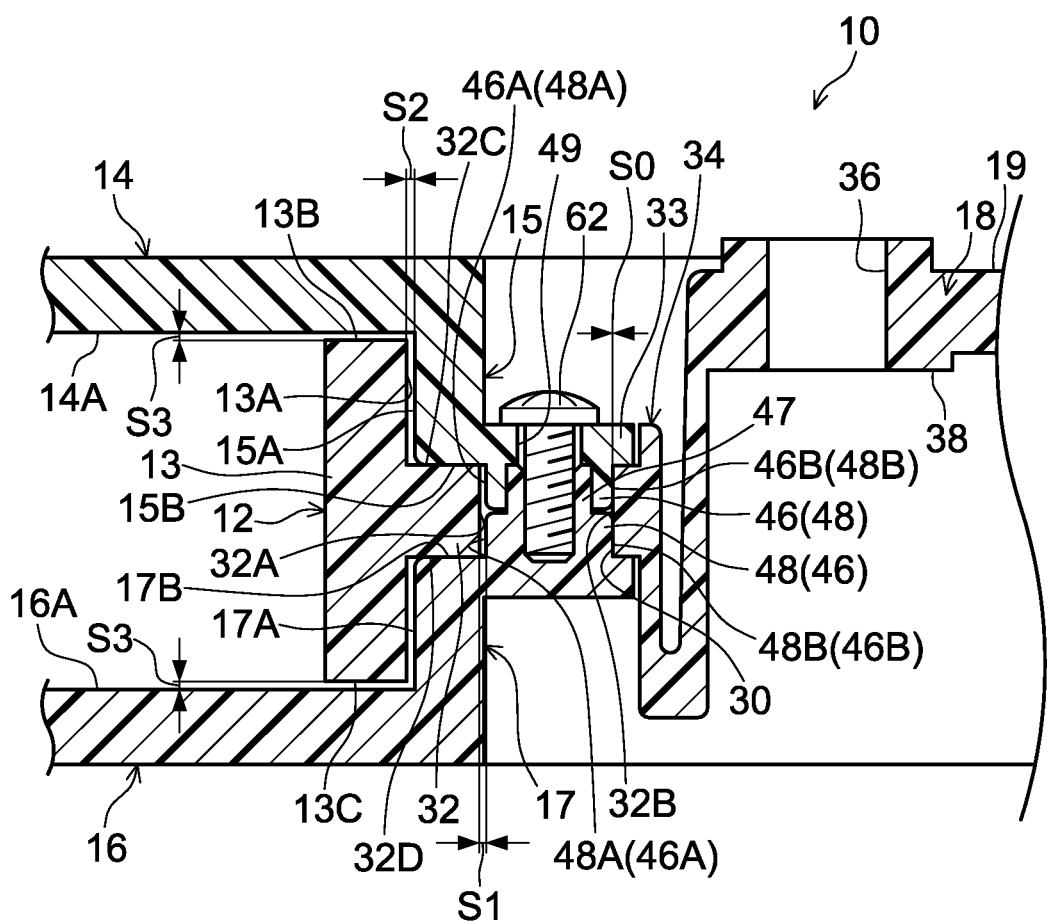
FIG. 9 is an enlarged cross-sectional view in a radial direction showing main portions of a reel pertaining to a third embodiment.

As shown in FIG. 9, the reel 10 pertaining to the third embodiment differs from the reel 10 pertaining to the first embodiment and the reel 10 pertaining to the second embodiment only in that a deformation absorbing portion 34 that is annularly continuous and has a substantially U-shaped cross section is formed between the axial center portion 18 and the connecting portion 32. The deformation absorbing portion 34 is for further suppressing deformation of the reel hub 12 (the cylinder portion 13) caused by the tightening force of the recording tape T, to further ensure that deformation does not affect the upper flange 14 and the lower flange 16.

Specifically, the deformation absorption portion 34 is configured in an annular shape so as to have elasticity in the radial direction by bending the lower end portion of the axial center portion 18 outward in the radial direction, and the radial direction outside section of the deformation absorption portion 34 is disposed continuously and integrally with the radial direction inside section of the connecting portion 32. Consequently, the deformation absorbing portion 34 can absorb, in the radial direction, the tightening force of the recording tape T, can further suppress deformation of the cylinder portion 13 of the reel hub 12 caused by that tightening force, and can further ensure that deformation does not affect the upper flange 14 and the lower flange 16.

The reels 10 and 20 pertaining to the embodiments have been described above on the basis of the drawings, but the reels 10 and 20 pertaining to the embodiments are not limited to the reels shown in the drawings and can undergo appropriate design changes without departing from the gist of the present invention. For example, the reel 10 shown in the drawings is configured in such a way that the upper flange 14 and the lower flange 16 are joined together by the two types of projecting portions 46 and 48 whose shapes are different, but the reel 10 may also be configured in such a way that the upper flange 14 and the lower flange 16 are joined together by three or more types of projecting portions (not shown in the drawings) whose shapes are different.

However, in that case, it is preferred that the projecting portions whose shapes are different be formed alternately and at equidistant intervals. Because of this, axial run-out of the upper flange 14 and the lower flange 16 can be suppressed or prevented. Furthermore, the upper flange 14 and the lower flange 16 may also be given a configuration wherein they are joined together by adhesion.

Moreover, the annular projecting portions 38 are not limited to being formed on and coaxially with the lower surfaces of the screw hole portions 36 and may also be formed on a common circumference different from that of the screw hole portions 36 of the axial center portions 18 and 28. Furthermore, although it is not shown in the drawings, it is also possible to apply the reels 10 and 20 pertaining to the embodiments to a recording tape cartridge in which just one reel is housed inside a case.

Furthermore, the disclosure of Japanese Patent Application No. 2012-82920 is incorporated in its entirety herein by reference. All publications, patent applications, and technical standards mentioned in the specification are incorporated herein by reference to the same extent as if each individual publication, patent application, or technical standard was specifically and individually indicated to be incorporated by reference.

What is claimed is:

1. A reel comprising:
   a hub that is equipped with an axial center portion, a cylinder portion, and a connecting portion that interconnects an outer peripheral surface of the axial center portion and an inner peripheral surface of the cylinder portion in a position away from axial direction end surfaces of the cylinder portion, with recording tape being wound around an outer peripheral surface of the cylinder portion and a plurality of through holes being formed at the connecting portion;
   an annular first flange that is disposed on one axial direction end portion of the hub and is equipped with first insertion portions that are inserted into the through holes in the connecting portion;
   an annular second flange that is disposed on the other axial direction end portion of the hub and is equipped with second insertion portions that are inserted into the through holes in the connecting portion; and joint portions that are configured to join a surface of the first insertion portions directly with a surface of the second insertion portions, with spaces between radial direction inside wall surfaces of the through holes and radial direction inside wall surfaces of the first insertion portions and the second insertion portions being smaller than spaces between radial direction outside wall surfaces of the through holes and radial direction outside wall surfaces of the first insertion portions and the second insertion portions.

2. The reel according to claim 1, wherein:

the first insertion portions are projectingly disposed on a first inner peripheral portion of the first flange that is inserted on an inner peripheral surface side of the cylinder portion, the second insertion portions are projectingly disposed on a second inner peripheral portion of the second flange that is inserted on the inner peripheral surface side of the cylinder portion, and spaces between the inner peripheral surface of the cylinder portion and radial direction outside wall surfaces of the first inner peripheral portion and the second inner peripheral portion are the same as or larger than the spaces between the radial direction outside wall surfaces of the through holes and the radial direction outside wall surfaces of the first insertion portions and the second insertion portions.

3. The reel according to claim 1, wherein the connecting portion is formed on an axial direction center portion of the cylinder portion.

4. The reel according to claim 3, wherein the first flange and the second flange are formed in the same shape.

5. The reel according to claim 1, wherein the axial center portion and the connecting portion are interconnected via a deformation absorbing portion that is formed in an annular shape and has a substantially U-shaped cross section.

6. The reel according to claim 1, wherein fastening portions for fastening to a rotation transmitting member of a drive device are formed at the axial center portion.

\* \* \* \* \*